United States Patent [19]

Kato

[11] Patent Number: 4,631,464
[45] Date of Patent: Dec. 23, 1986

[54] INDUSTRIAL ROBOT SYSTEM

[75] Inventor: Hisao Kato, Aichi, Japan

[73] Assignee: Mitsubishi Denki Kabushiki Kaisha, Tokyo, Japan

[21] Appl. No.: 784,093

[22] Filed: Oct. 4, 1985

[30] Foreign Application Priority Data

Oct. 5, 1984 [JP] Japan .................. 59-209407

[51] Int. Cl.$^4$ .............................................. G05B 9/02
[52] U.S. Cl. .................... 318/563; 318/565; 318/648; 901/49
[58] Field of Search ............... 318/460, 563, 565, 648, 318/649; 187/29 R; 901/49, 50

[56] References Cited

U.S. PATENT DOCUMENTS

| | | | |
|---|---|---|---|
| 3,095,532 | 6/1963 | Floyd | 318/460 |
| 3,792,759 | 2/1974 | Kirsch | 187/29 R |
| 3,815,710 | 6/1974 | Shrum | 187/29 R |
| 4,011,928 | 3/1977 | Spear | 187/29 R |
| 4,366,423 | 12/1982 | Inaba et al. | 318/563 |
| 4,896,925 | 6/1978 | Koob et al. | 187/29 R |

Primary Examiner—B. Dobeck
Attorney, Agent, or Firm—Leydig, Voit & Mayer

[57] ABSTRACT

An industrial robot system comprising a robot disposed in an environment having peripheral equipment and operable under program control of a control unit to shift between a normal job mode of operation and an earthquake mode of operation, an earthquake detector which produces an output in accordance with an earth vibration exceeding a predetermined value, and earthquake mode controller disposed between the earthquake detector and the control unit for generating a control output in response to the output of the earthquake detector to interrupt the normal job mode of operation of the robot and shift the robot to the earthquake mode of operation, whereby on the basis of the output of the earthquake detector, the normal job mode of operation of the robot is suspended through the earthquake mode controller and an actuator of the robot is moved in a direction away from peripheral equipment of the robot.

3 Claims, 9 Drawing Figures

INDUSTRIAL ROBOT SYSTEM

BACKGROUND OF THE INVENTION

This invention relates to an industrial robot system operated under program control and capable of switching over to an earthquake mode control at the occurrence of an earthquake.

An example of an industrial robot is disclosed in the published Japanese Patent Application Publication No. 55-21362. The manipulator arm corresponds to a workpiece conducting a continuous motion, and is operatively controlled according to a series of program steps.

The industrial robot as stated above has the problem that, when an earthquake has occurred, variations in an electric current due to vibrations will result in abnormal operation, triggering accidents such as the collision of the industrial robot against another device disposed in the surroundings.

SUMMARY OF THE INVENTION

This invention eliminates the aforementioned problem, and has for its object to provide an industrial robot which prevents abnormal operations attributed to an earthquake, thereby eliminating any accident at the occurrence of the earthquake from arising.

An industrial robot system according to this invention comprises a robot disposed in an environment having peripheral equipment and operable under program control of a control unit to shift between a normal job mode of operation and an earthquake mode of operation, an earthquake detector for detecting earth vibration and for producing a first detection signal when the vibration exceeds a predetermined value, and an earthquake mode controller disposed between the earthquake detector and the control unit for generating a control output in response to the first detection signal to interrupt the normal job mode of operation of the robot and shift the robot to the earthquake mode of operation, the robot being moved to a position away from the peripheral equipment when in the earthquake mode of operation.

In this invention, when an earthquake has been detected, an industrial robot is controlled so as to, at least, suspend normal operations and enter an earthquake mode of operation, whereby abnormal operations due to the earthquake are checked.

PREFERRED EMBODIMENTS OF THE INVENTION

Now, one embodiment of this invention will be described with reference to FIGS. 1 to 8.

Figure 1:
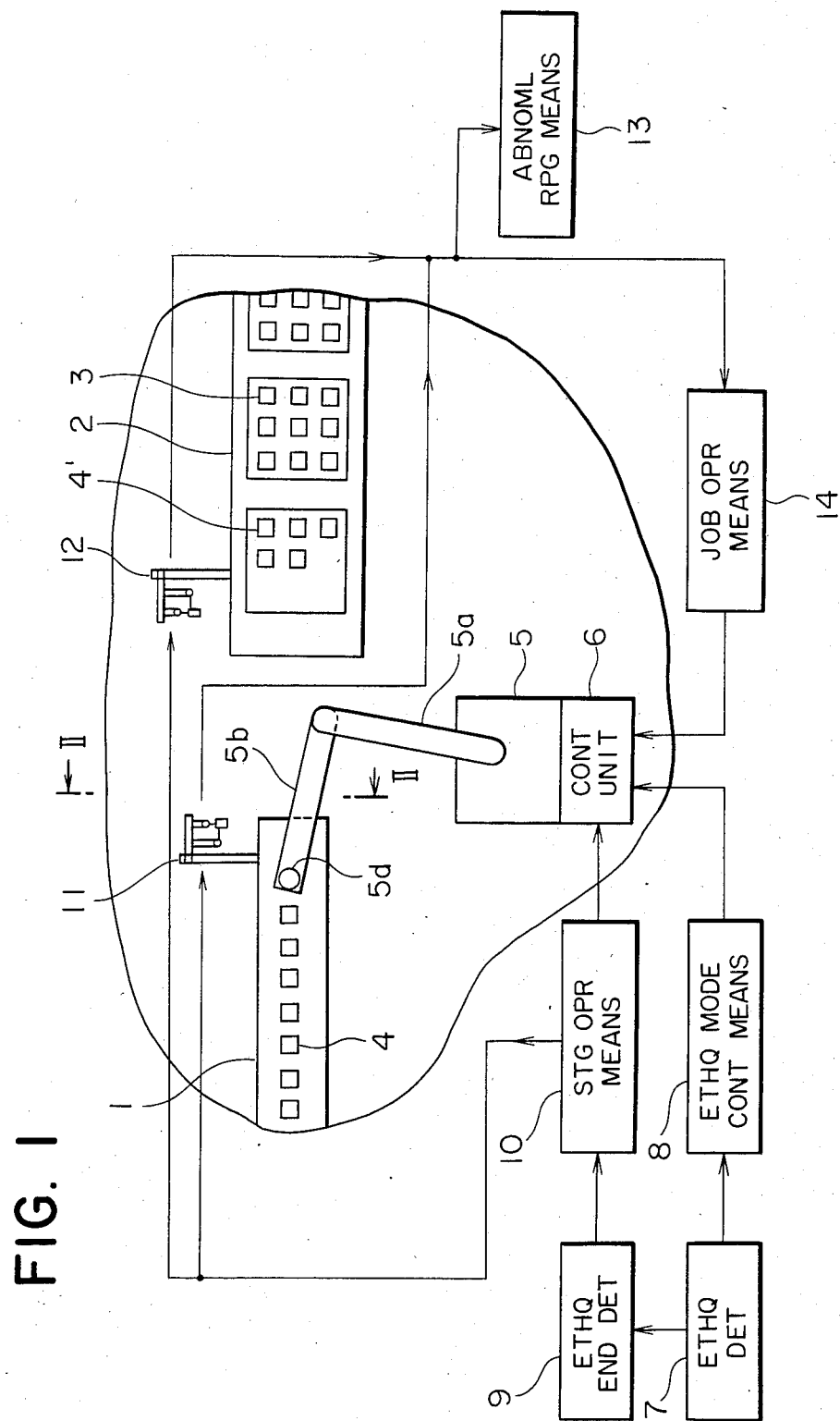
FIG. 1 is a conceptual general arrangement diagram of one embodiment of an industrial robot system according to this invention.
Figure 2:
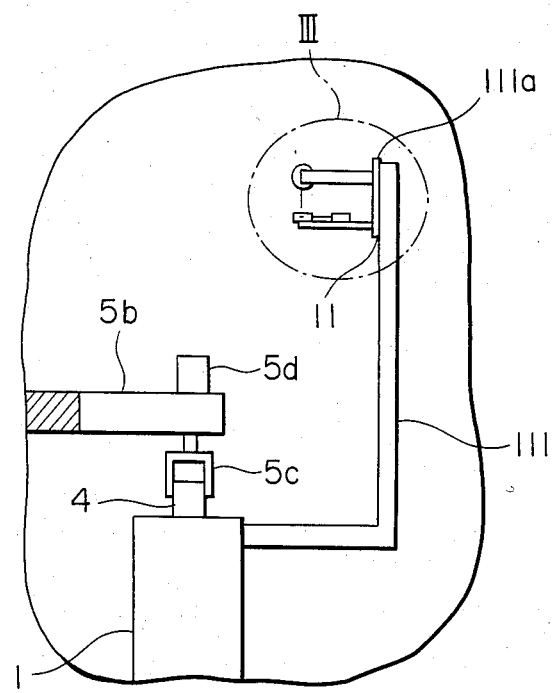
FIG. 2 is an enlarged sectional view taken along line II—II in FIG. 1, showing a first detection device in FIG. 1.
Figure 3:
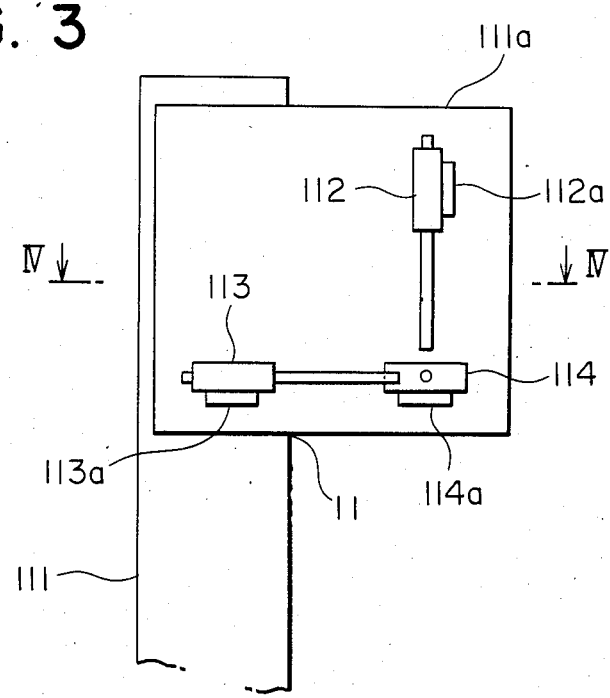
FIG. 3 is an enlarged left-side view of portion III in FIG. 2.
Figure 4:
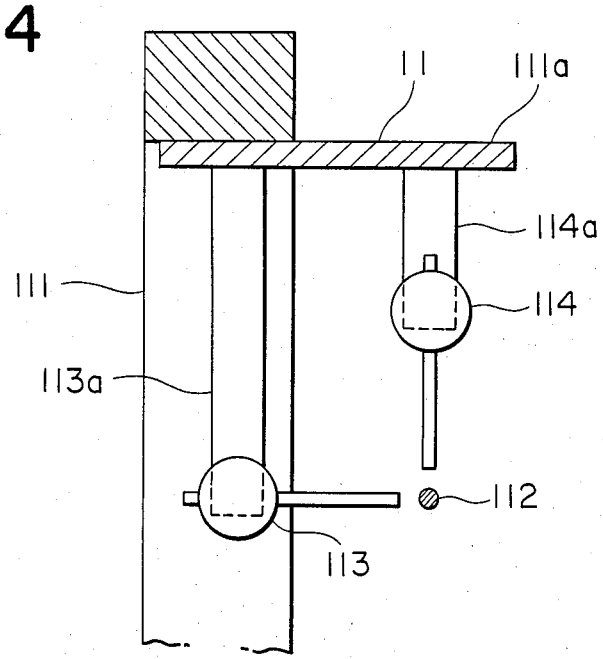
FIG. 4 is an enlarged sectional view taken along line IV—IV in FIG. 3.

FIG. 1 is a general arrangement diagram. In the figure, numeral 1 designates a feed conveyor, and numeral 2 a job conveyor. A box 3 is transported by the job conveyor 2, a component 4 is transported by the feed conveyor 1, and a component 4' has been received at a predetermined position in the box 3. A robot 5 is installed between the opposing end parts of the feed conveyor 1 and the job conveyor 2. The robot 5 has a first arm 5a, an actuator 5b constructed of a second arm which has one end pivotally mounted on the first arm 5a and which has a hand 5c attached to the other end, and a cylindrical protrusion 5d which is provided at the fore end of the actuator 5b and on a side remote from the hand 5c. Numeral 6 indicates a control unit for the robot 5. An earthquake detector 7 senses the vibration from the earthquake and produces an output when the vibration exceeds a predetermined value. Earthquake mode control means 8 includes a program which suspends the operation of the robot 5 through the control unit 6. An earthquake end detector 9 produces an output when the vibration of an earthquake has become equal to or lower than the predetermined value. Starting operation means 10 includes a program which brings the robot 5 to a starting operation through the control unit 6 to move the actuator 5b to a predetermined position. A first detection device 11 is disposed at the end part of the feed conveyor 1, while a second detection device 12 is disposed at the end part of the job conveyor 2. These first and second detection devices 11 and 12 are activated when the actuator 5b reaches predetermined positions relative to the first and second detection devices 11 and 12. Abnormality reporting means 13 constructed of a photoelectric device, a buzzer or/and the like is energized in a case where the first and second detection devices 11 and 12 do not operate in spite of the starting operation of the robot 5. Job operation means 14 includes a program with which, when the first and second detection devices 11 and 12 have operated in response to the starting operation of the robot 5, an output is produced to operate the robot 5 through the control unit 6.

Figure 5:
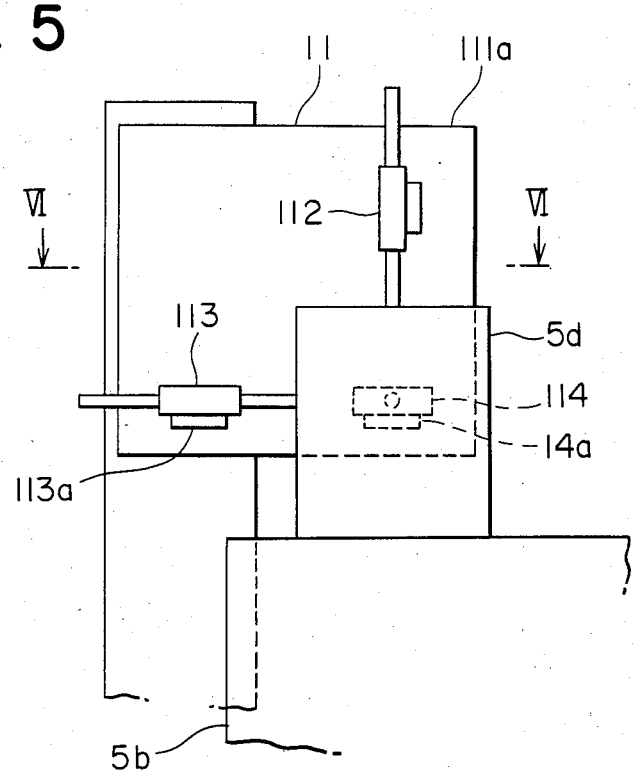
FIG. 5 is a view corresponding to FIG. 3, elucidating the operation of the first detection device in FIG. 1.
Figure 6:
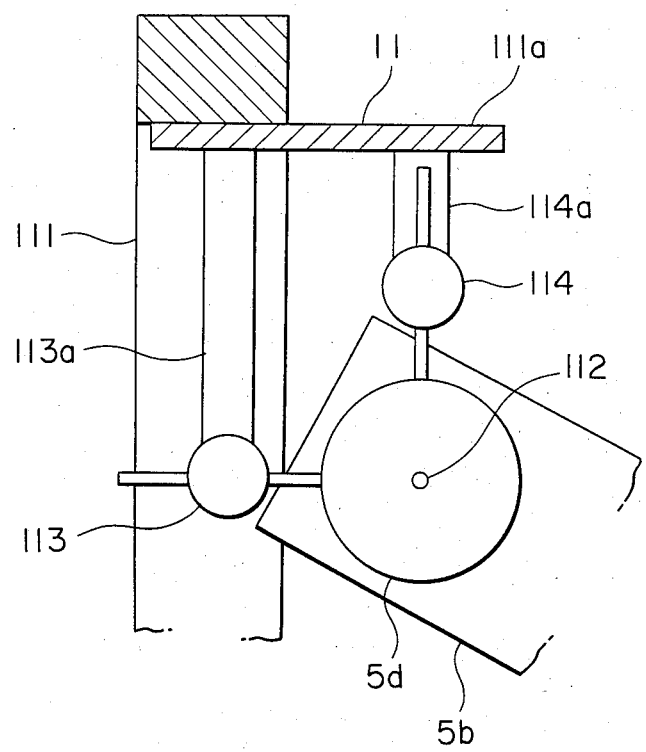
FIG. 6 is a sectional view taken along line VI—VI in FIG. 5.

FIGS. 2 to 6 show the first detection device 11 in FIG. 1. In the drawings, the same symbols as in FIG. 1 indicate identical portions. Numeral 111 indicates a stanchion which has its lower end fixedly erected on the feed conveyor 1 and which is provided with a seating plate 111a at its upper end part. The first detection device 11 includes a first detector 112 constructed of a dial gauge type detector which is installed on a mounting plate 112a protruded from the seating plate 111a and which is arranged so as to operate in upward and downward directions; a second detector 113 similar to the first detector 112, which is installed on a mounting plate 113a and which is arranged so as to operate in rightward and leftward directions; and a third detector 114 similar to the first detector 112, which is installed on a mounting plate 114a and which is arranged so as to operate in frontward and rearward directions. The first to third detectors 112-114 are depressed by the protrusion 5d of the actuator 5b as illustrated in FIGS. 5 and 6, and the first detection device 11 operates when the magnitudes of the depressions lie within predetermined ranges. Although not shown in detail, the second detection device 12 is a detection device which is disposed at the end part of the job conveyor 2 and has first to third detectors likewise to the first detection device 11 and which operates when the magnitudes of depressions of the detectors by the protrusion 5d lie in predetermined ranges.

Figure 7:
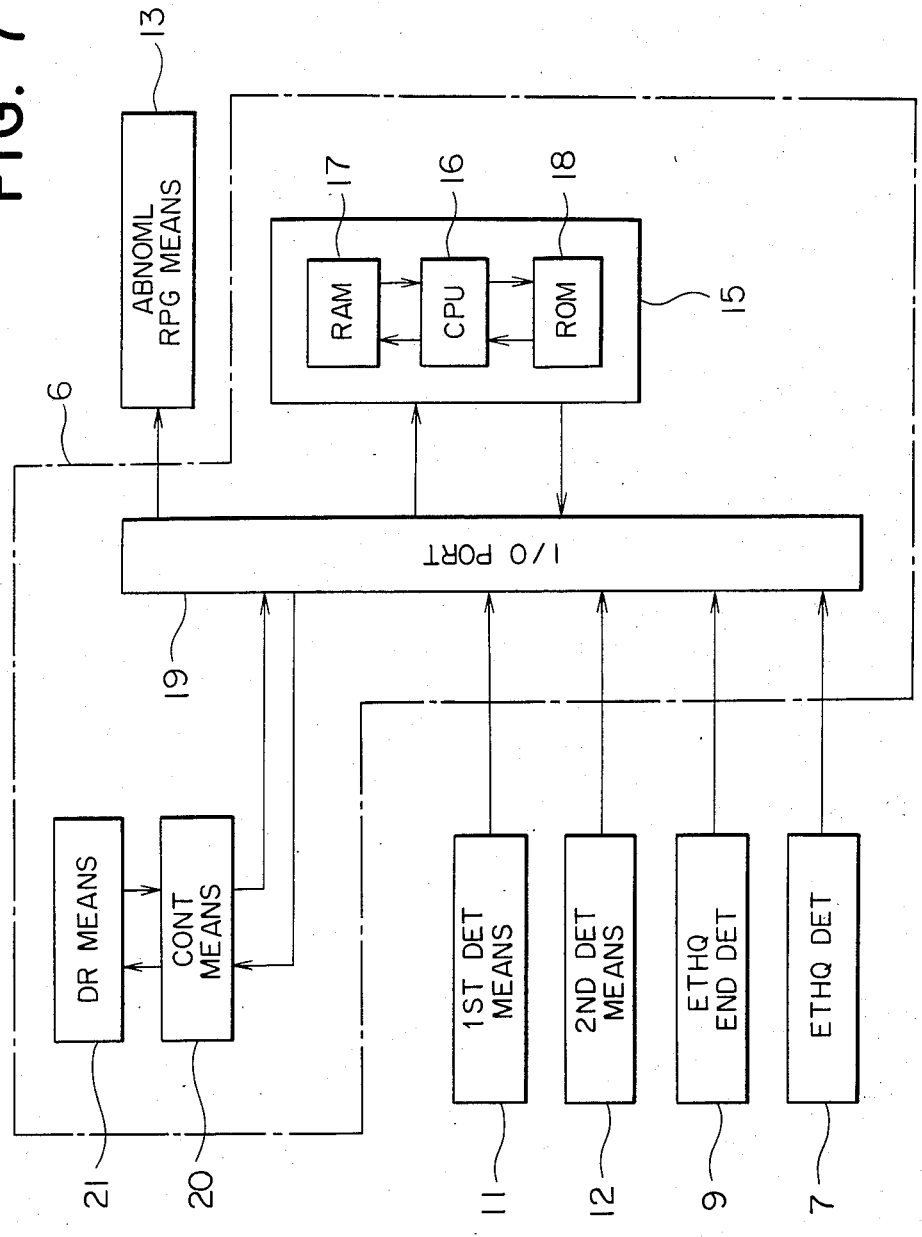
FIG. 7 is a conceptual circuit diagram showing the electrical connection of the embodiment in FIG. 1.

FIG. 7 is a circuit diagram which conceptually shows the electrical connection of the general arrangement in FIG. 1. Numeral 15 designates a computer in the control unit 6, which comprises a CPU 16, a RAM 17 and a ROM 18. Numeral 19 indicates an I/O port, numeral 20 control means for the robot 5, and numeral 21 drive means for the robot 5.

Figure 8:
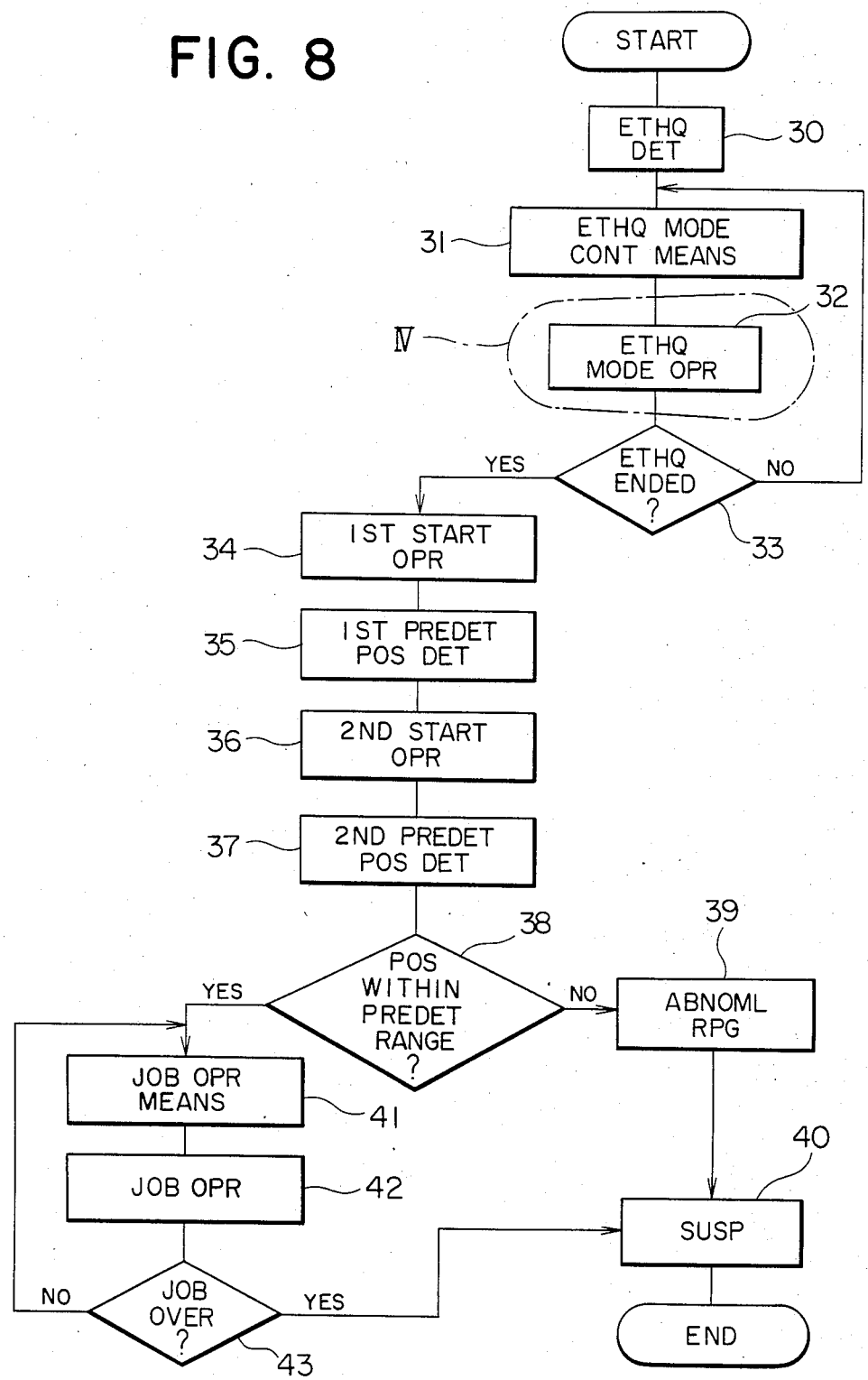
FIG. 8 is a flow chart showing the operation of the embodiment in FIG. 1.

Next, the operation of the embodiment the general arrangement of which is shown in FIG. 1 will be described with reference to a flow chart shown in FIG. 8.

When, under the job operation of the robot 5, the earthquake detector 7 operates to effectuate earthquake detection at Step 30, the earthquake mode control means 8 at Step 31 based on the program of the computer 15 brings the robot 5 to the earthquake mode operation at Step 32 through the control means 20 as well as the drive means 21, so that the programed operation of the job operation means 14 is suspended. Thus, the occurrence of an abnormal operation ascribable to the earthquake vibrations of the robot 5 and an abnormal operation ascribable to the damage of the electric circuit by the earthquake vibrations can be prevented, and any secondary accident due to the earthquake can be prevented from arising. In addition, if the earthquake end detector 9 is not operating at Step 33, the earthquake mode operation is continued. In contrast, if the earthquake end detector 9 is operating at Step 33, the robot 5 or the actuator 5b is brought to a first starting operation at Step 34 and is stopped at the predetermined position of the first detection device 11 through the control means 20 as well as the drive means 21 by the starting operation means 10 based on the program of the computer 15. Then, the first to third detectors 112–114 are depressed by the protrusion 5d as shown in FIGS. 5 and 6, and first predetermined position detection at Step 35 is executed on the basis of the magnitudes of the depressions thereof. Subsequently, according to the program of the computer 15, the robot 5 is restarted, and the actuator 5b is brought to a second starting operation at Step 36 until it stops at the predetermined position of the second detection device 12. Then, second predetermined position detection at Step 37 is executed as in the case of the first detection device 11. Besides, if the results of the first and second predetermined position detection operations 35 and 37 at Step 38 based on the computer 15 do not indicate positions within predetermined ranges, Step 39 energizes the abnormality reporting means 13 and informs an operator of the abnormality. Subsequently, the robot 5 is suspended by Step 40.

Thus, it is possible to prevent any accident attributed to the fact that the robot 5 is operated while such an abnormality as the deviation of an operating origin caused by the impartation of the vibrations due to the earthquake remains occurring. Meanwhile, if the results of the first and second predetermined position detection operations 35 and 37 at Step 38 indicate positions within the predetermined ranges, the job operation means 14 at Step 41 based on the program of the computer 15 is appointed to bring the robot 5 to the job operation, whereby the component 4 is received in the predetermined position of the box 3 from the feed conveyor 1. Subsequently, if the job is not over at Step 43, the robot 5 continues the job, and if the job is over, the robot is suspended by Step 40. In this manner, when the results of the starting operation of the robot 5 indicate the positions within the predetermined ranges, that is, when the operating origin is normal without any abnormality due to the earthquake, the robot 5 shifts to the job operation automatically after the end of the earthquake. Therefore, any accident due to the earthquake is prevented from occurring, and the robot 5 can be operated and managed with less labor.

Figure 9:
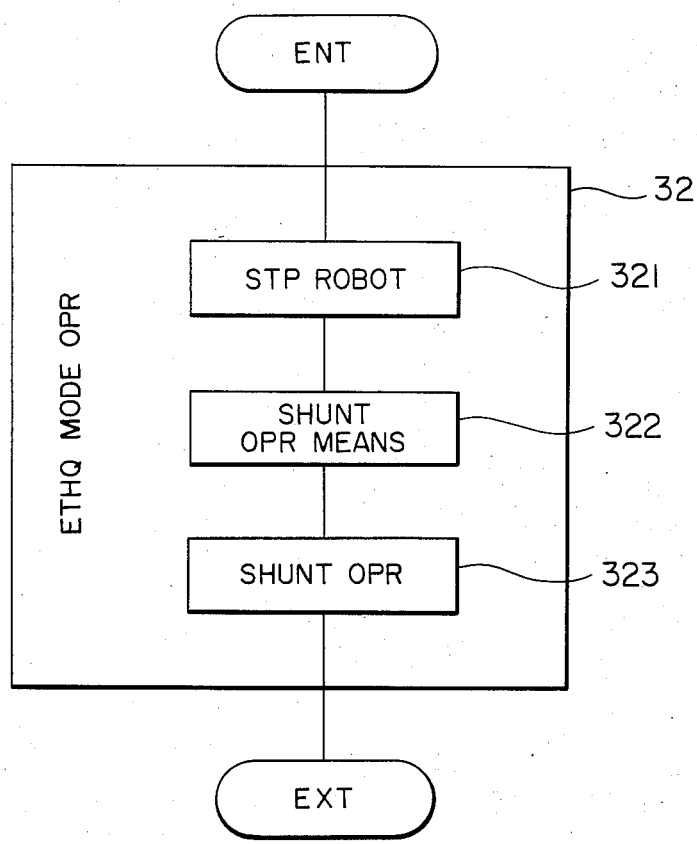
FIG. 9 is a diagram corresponding to portion IX in FIG. 8, showing another embodiment of the industrial robot system according to this invention.

FIG. 9 shows another embodiment of this invention, in which the robot 5 is controlled as follows by the earthquake mode operation of Step 32. The programed operation of the job operation means 14 is suspended by Step 321. Subsequently, shunt operation means at Step 322 based on the program of the computer 15 brings the robot 5 to a shunt operation at Step 323. Thus, at least the actuator 5b moves to and stops at a position which is distant from the peripheral equipment such as the feed conveyor 1. Accordingly, the embodiment in FIG. 9 attains the functions of the embodiment in FIGS. 1 to 8 and can also prevent such drawbacks as damages which are inflicted upon the robot 5 by unusual changes ascribable to the earthquake, e.g., the violent fall of another equipment disposed near the robot 5, so that the safety at the occurrence of the earthquake can be enhanced more.

As explained above, this invention consists in disposing an earthquake detector which produces an output in accordance with a vibration exceeding a predetermined value, and earthquake mode control means to bring a robot to an earthquake mode operation through a control unit which controls the robot, whereby on the basis of the output of the earthquake detector, the robot is suspended through the earthquake mode control means and an actuator of the robot is shunted in a direction of coming away from equipment near the robot. Thus, an industrial robot system is realized which can prevent the occurrence of any abnormal operation of the robot ascribable to an earthquake and which, owing to the shunt operation, can prevent damages on the robot due to the unusual change of the peripheral equipment of the robot ascribable to the earthquake, thereby to prevent any secondary disaster ascribable to the earthquake from arising.

I claim:

1. An industrial robot system comprising:
a robot disposed in an environment having peripheral equipment and operable under program control of a control unit to shift between normal job mode operation and earthquake mode operation,
earthquake detection means for detecting earth vibration and for producing a first detection signal when the vibration exceeds a predetermined value,
earthquake mode control means disposed between said earthquake detection means and said control unit for generating a control output in response to the first detection signal to interrupt the normal job mode operation of said robot and shift said robot to the earthquake mode operation, said robot being moved to a position away from the peripheral equipment under the earthquake mode operation.

2. An industrial robot system according to claim 1 further comprising earthquake end detection means for producing a second detection signal when the vibration drops to a level less than the predetermined value, starting operation means operated responsive to the second detection signal for generating a command output, and location detection means responsive to the command output for determining locations of said robot in the environment.

3. An industrial robot system according to claim 2 wherein said starting operation means is energized responsive to the output of said earthquake end detection means, to reactivate said control unit so as to move said robot to a predetermined position, and further comprising location detection means disposed at predetermined positions and operable when the predetermined position of said robot lies within a predetermined range thereof, and job operation means responsive to the operation of said location detection means to energize said control unit so as to operate said robot in an ordinary mode operation, said job operation means being connected to said location detection means for generating a second control output when the locations of the robot lie within a predetermined range in the environment, said control unit being responsive to the second control output to terminate the earthquake mode of operation of the robot and to resume the normal job mode operation.

* * * * *